May 29, 1945.  W. O. SCHWARTZ ET AL  2,377,109

VIEWER

Filed May 28, 1943

INVENTOR.
William O. Schwartz,
Grace B. Schwartz.
By [signature]
Atty.

Patented May 29, 1945

2,377,109

UNITED STATES PATENT OFFICE 2,377,109

VIEWER

William O. Schwartz and Grace B. Schwartz,
Los Angeles, Calif.

Application May 28, 1943, Serial No. 488,848

1 Claim. (Cl. 88—29)

Our invention has to do with picture-viewing devices and, more particularly, it relates to viewing boxes in which opaque images may be viewed through a suitable magnifying eye piece of adjustable focus.

The view boxes of the prior art are typified by the well-known chromoscope, in which a transparency is mounted between the lens and a light source. However, such devices are unsuited for viewing opaque images such as ordinary black and white prints and it is therefore one of the more important objects of our invention to provide a view box which, while having many of the characteristics of the chromoscope, incorporates means for rendering the device useable for viewing opaque prints.

It is also an object of our invention to provide a device of this character which may be used either as a chromoscope or for viewing opaque prints.

Additional objects are inherent in the invention and in order to render the invention clearly understandable, we shall in the following description explain one manner of carrying it out. In the particular adaptation chosen for illustrative purposes, this object is achieved by providing a light-passing opening in the view box between the lens or eye piece and the image and adjustably mounting a light reflector in the opening. In the description I shall refer to the accompanying drawing, in which.

Figure 1:
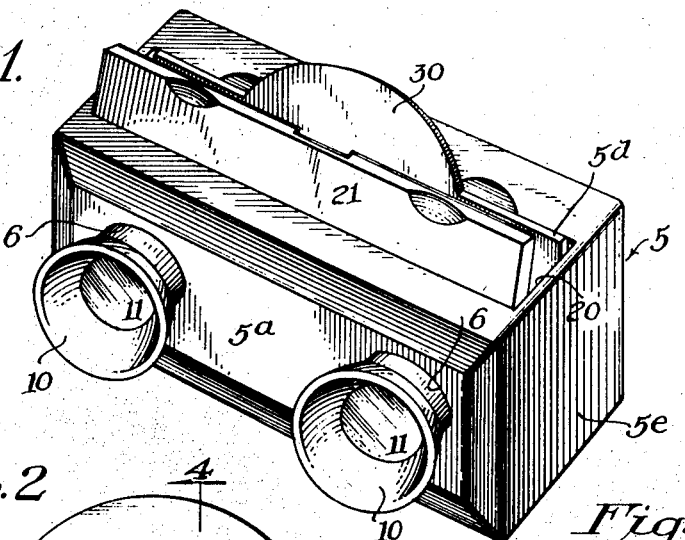
Fig. 1 is a perspective.
Figure 2:
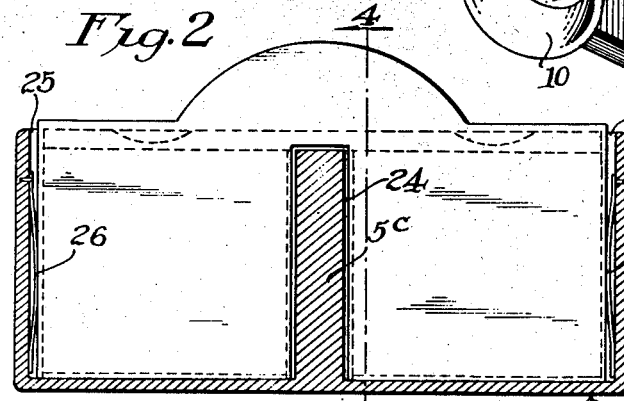
Fig. 2 is a longitudinal section taken on line 2—2 of Fig. 4.

Referring to the drawing, we show at 5 a rectangular box-like case having a front wall 5a provided with a pair of eye piece mounting openings 6, back wall 5b, a transverse division wall 5c, a top wall 5d, and end walls 5e. Although for the principal purposes of our invention the back wall may be made of any suitable material whether opaque or translucent, we show it made of a translucent material such as ground glass, to enable the device to be useable also as a chromoscope.

Rotatably and slidably disposed in openings 6 we provide a pair of tubular eye pieces 10 within each of which there is a magnifying lens 11. For purposes of adjusting the focus, each eye piece tube 10 has a spiral slot 15 into which projects a pin 16 secured in the side wall of the hole 6 so that as the tube 10 is rotated it is moved inwardly or outwardly of the opening.

Through the top wall 5d we provide a rectangular opening 20 within which we hingedly mount a swinging cover 21, the hinge 22 being of a pair of coaxial pins extending through the end walls of the casing and projecting into the end edges of the cover 21 adjacent its front edge.

Figure 3:
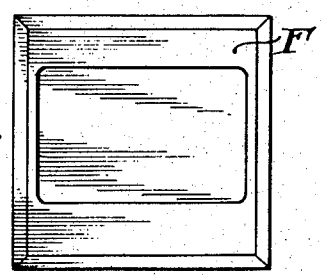
Fig. 3 is an elevational view of one form of picture-carrying frame.

For the purpose of mounting image-carrying frames in the device, vertical slots 24 are provided in opposite faces of the division wall 5c and vertical slots 25 are provided in the inner surface of the end walls of the casing, a leaf spring 26 being longitudinally mounted in each of the last-named slots to resiliently retain the frame in the slots. We prefer to use a unitary frame 27 for carrying duplicate prints 28, which frame has a central slot 29 to enable it to be inserted over the division wall 5c and has a projecting tab 30 to facilitate inserting and removing the frame. A pair of single frames F, such as shown in Fig 3, may be substituted for the double frame 27, if desired. Cover member 21 is sufficiently narrower than the width of the opening 20 so that when the cover is closed there remains a space or slot between the rear edge of the cover and the adjacent edge of the opening 20 sufficient to permit insertion and removal of the frames relative to the slots 24, 25.

Figure 4:
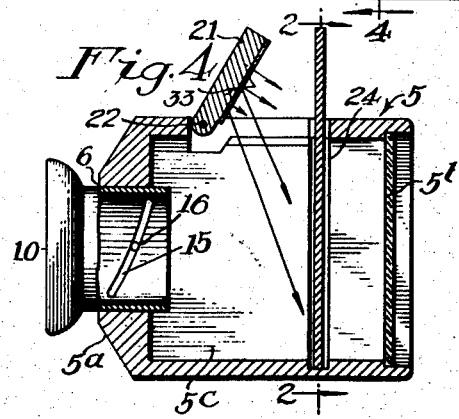
Fig. 4 is a transverse section on line 4—4 of Fig. 2.
Figure 5:
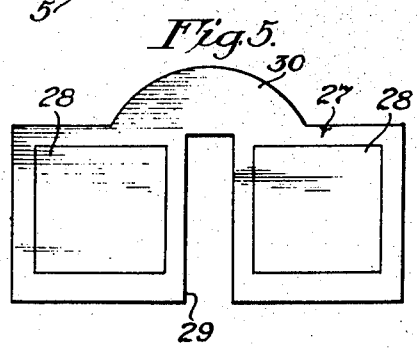
Fig. 5 is a front elevation of another type of image-carrying frame.

The cover 21 is provided with a light-reflective under surface 33 so that when opened to the proper angle (see Fig. 4) it will reflect light onto the image carried by the frame.

From the foregoing it will be observed that duplicate opaque images may be viewed simultaneously, one within each of the compartments provided at opposite sides of the division wall 5c. The eye pieces may be individually focused on the respective images to suit the operator and the cover 21 with its light-reflective under surface may be swung into the proper angle to provide the desired reflected light on the image. Also, as will be obvious, if the rear wall 5b is translucent, the device may be used as a chromoscope, in which event the cover 21 would be closed.

While, in the foregoing, we have resorted to considerable detail of structure and association of parts in describing a particular example of our invention, we wish it to be understood that we have done so merely to make our invention understood and that we do not limit the invention to such details. On the contrary, our invention is only to be limited as appears in the appended claim.

We claim:

A picture viewing device comprising a box-like casing, a pair of lens members adjustably mounted in the front wall of the casing, the top wall of the casing having a rectangular window therethrough, a medial wall extending between the front and rear walls and dividing the casing into two viewing compartments viewable through the respective lenses, a vertical slot in each side wall of the casing, a vertical slot in each of the opposite side faces of the medial wall registering with the first-mentioned slots, said slots extending to said window and being adapted to receive an image-carrying slide, and a cover lid for the window swingably mounted on the casing, said cover lid being sufficiently narrower than the window to leave the top ends of the slots uncovered.

WILLIAM O. SCHWARTZ.
GRACE B. SCHWARTZ.